United States Patent Office 2,834,810
Patented May 13, 1958

2,834,810

DIHALO DINITROCYCLIC KETONES AND PROCESS FOR PRODUCING SAME

Henry Feuer, Lafayette, Ind., and James W. Shepherd, Mars, Pa., assignors to Purdue Research Foundation, Lafayette, Ind., a corporation of Indiana No Drawing. Application June 14, 1956
Serial No. 591,507

14 Claims. (Cl. 260—586)

Our invention relates to dihalo dinitrocyclic ketones and more particularly it relates to $\alpha,\alpha'$-dihalo-$\alpha,\alpha'$-dinitrocyclic ketones and a process for producing same.

In our application Serial No. 536,779, filed July 11, 1955, we have described the production of dinitrocyclic ketones which are obtained in the form of potassium salts and since the dipotassium dinitrocyclic ketones are hygroscopic and not easily purified, we showed in our prior application that we can convert the dipotassium dinitrocyclic ketones to $\alpha,\alpha',\omega,\omega'$-tetrabromo-$\alpha,\alpha'$-dinitroparaffins by brominating the dipotassium dinitrocyclic ketone under aqueous conditions.

We have now found that we can produce $\alpha,\alpha'$-dihalo-$\alpha,\alpha'$-dinitrocyclic ketones by halogenating the dipotassium $\alpha,\alpha'$-dinitrocyclic ketones under anhydrous conditions. Our new process can be illustrated by the following equation:

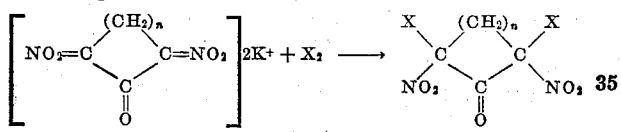

where $n$ is an integer from 1 to 5 inclusive, and X is a halogen selected from the group consisting of chlorine and bromine.

Our new compounds are useful as intermediates in the production of polynitroparaffins compounds which are in turn useful as rocket propellants. For example, 2,5-dibromo-2,5-dinitrocyclopentanone can be reacted with methanolic hydrogen chloride to obtain dimethyl 2-bromo-2-nitroglutarate and methyl-2,5-dibromo-2,5-dinitropentanoate.

As indicated above, our new dihalo dinitrocyclic ketones are obtained by halogenation of the corresponding dinitrocyclic ketone under anhydrous conditions. For purposes of our invention, we intend for the term halogen or halo to include the compounds chlorine and bromine and the term halogenation to include chlorination and bromination. Thus we can halogenate dinitrocyclic ketones such as, for example, 2,4-dinitrocyclobutanone, 2,5-dinitrocyclopentanone, 2,6-dinitrocyclohexanone, 2,7-dinitrocycloheptanone, 2,8-dinitrocyclooctanone, etc. under anhydrous conditions to obtain the corresponding dihalo dinitrocyclic ketone products. Since the dinitrocyclic ketones are ordinarily obtained as the dipotassium salt, the starting material for our process is generally in this form. Since the dipotassium dinitrocyclic ketones are solid materials and since the halogen is a liquid or gas, we ordinarily carry out our process in the presence of an inert solvent such as ether, chloroform, carbon tetrachloride, hexane, toluene, tetrahydrofuran, etc.

In carrying out our reaction for the production of our new compounds, we employ temperatures below about 10° C. in order to minimize side reactions. Preferably we employ temperatures of about —5° C. We also prefer to slowly add the halogen to the suspension of the dinitrocyclic ketone. Following addition of the halogen, the dihalo dinitrocyclic ketone product can be recovered by any convenient means. Ordinarily, we prefer to filter the reaction mixture, extract the solid residue with ether, evaporate the combined ether extract and filtrate from the reaction mixture in vacuo and recrystallize the solid product from carbon tetrachloride.

The following examples are offered for purposes of illustration and we do not tend to be limited to the particular materials, proportions, or procedures shown. Rather we intend to include within the scope of this application all equivalents obvious to those skilled in the art.

Example I

A suspension of 6.25 grams of dipotassium 2,5-dinitrocyclopentanone in 70 ml. of anhydrous ether contained in a 3-neck flask, fitted with a glass stirrer, a pressure equalizing dropping funnel, and a reflux condenser topped with a calcium chloride drying tube was cooled to —5° C. by means of a Dry Ice bath. A solution of 8 grams of bromine in 35 ml. of dry carbon tetrachloride was added dropwise over a period of one hour. The reaction mixture was filtered and the solid residue extracted with ether in a Soxhlet extraction apparatus. The combined ether extract and reaction filtrate were evaporated in vacuo and the solid product was recrystallized from carbon tetrachloride. The product, 2,5-dibromo-2,5-dinitrocyclopentanone weighed 5.27 grams for a yield of 71%. The product had a melting point of 122–125° C.

Example II

Using the process of Example I except using chlorine instead of bromine, the dipotassium salts of dinitrocyclobutanone, dinitrocyclopentanone, and dinitrocyclohexanone were converted to the corresponding dichloro dinitrocyclic ketone.

Example III

Using the process described in Example I, the dipotassium salts of dinitrocyclobutanone, dinitrocyclohexanone, dinitrocycloheptanone, and dinitrocyclooctanone were converted to the corresponding dibromo dinitrocyclic ketone.

Example IV

A solution of 8.3 g. of 2,5-dibromo-2,5-dinitrocyclopentanone in 40 ml. of methanolic hydrogen chloride was heated to reflux rapidly and refluxed for 5 minutes. The reaction mixture was then cooled and the excess solvent and hydrogen chloride evaporated in vacuo. The reaction mixture was then distilled under vacuo to obtain a fraction boiling at 91° C. at 0.35 mm. Hg which fraction crystallized upon refrigeration. The solid material was recrystallized from hexane to obtain dimethyl 2-bromo-2-nitroglutarate, M. P. 67.7–68.0° C. The distillation was continued to obtain a second fraction at 125–127° C. at 0.35 mm. Hg $n_D^{20}$ 1.5120, for a 50.6% yield of methyl-2,5-dibromo-2,5-dinitropentanoate.

Now having described our invention, what we claim is:

1. Dihalo dinitrocyclic ketones having the following structural formula

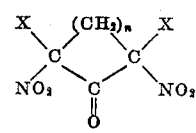

where X is a hologen selected from the group consisting of bromine and chlorine and where $n$ is an integer from 1 to 5.

2. 2,4-dibromo-2,4-dinitrocyclobutanone.
3. 2,5-dibromo-2,5-dinitrocyclopentanone, 4. 2,6-dibromo-2,6-dinitrocyclohexanone.
5. 2,5-dichloro-2,5-dinitrocyclopentanone.
6. 2,7-dibromo-2,7-dinitrocycloheptanone.
7. A process for producing dihalo dinitrocyclic ketones having the following structural formula

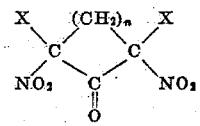

where X is a hologen selected from the group consisting of bromine and chlorine and where n is an integer from 1 to 5 which comprises reacting a halogen selected from the group consisting of bromine and chlorine with a dipotassium dinitrocyclic ketone having the formula

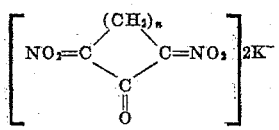

where n is an integer from 1 to 5 under anhydrous conditions.

8. A process for producing dihalo dinitrocyclic ketones having the structural formula

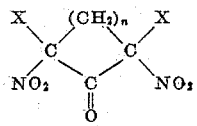

where X is a halogen selected from the group consisting of chlorine and bromine and where n is an integer from 1 to 5 which comprises reacting a halogen selected from the group consisting of chlorine and bromine with a dipotassium dinitrocyclic ketone having the formula

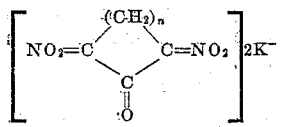

where n is an integer from 1 to 5 under anhydrous conditions in the presence of an inert liquid medium.

9. A process for producing a dibromo dinitrocyclic ketone having the following structural formula

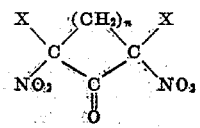

where X is a halogen selected from the group consisting of chlorine and bromine and where n is an integer from 1 to 5 which comprises reacting a halogen selected from the group consisting of chlorine and bromine with a dipotassium dinitrocyclic ketone having the formula

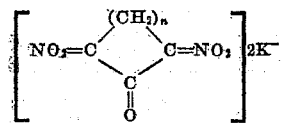

where n is an integer from 1 to 5 under anhydrous conditions in the presence of an inert medium at a temperature below about 10° C.

10. A process for producing 2,4-dibromo-2,4-dinitrocyclobutanone which comprises reacting bromine with the dipotassium salt of 2,4-dinitrocyclobutanone under anhydrous conditions in the presence of an inert liquid medium at a temperature below about 10° C.

11. A process for producing 2,5-dibromo-2,5-dinitrocyclopentanone which comprises reacting bromine with the dipotassium salt of 2,5-dinitrocyclopentanone under anhydrous conditions in the presence of an inert liquid medium at a temperature below about 10° C.

12. A process for producing 2,6-dibromo-2,6-dinitrocyclohexanone which comprises reacting bromine with the dipotassium salt of 2,6-dinitrocyclohexanone under anhydrous conditions in the presence of an inert liquid medium at a temperature below about 10° C.

13. A process for producing 2,7-dibromo-2,7-dinitrocyclohexanone which comprises reacting bromine with the dipotassium salt of 2,7-dinitrocycloheptanone under anhydrous conditions in the presence of an inert liquid medium at a temperature below about 10° C.

14. A process for producing 2,6-dichloro-2,5-dinitrocyclopentanone which comprises reacting chlorine with the dipotassium salt of 2,5-dinitrocyclopentanone under anhydrous conditions in the presence of an inert liquid medium at a temperature below about 10° C.

References Cited in the file of this patent

Cowper et al.: Org. Syntheses, Coll. Vol. II, pp. 480–481 (1943).

UNITED STATES PATENT OFFICE

CERTIFICATE OF CORRECTION

Patent No. 2,834,810                                                            May 13, 1958

Henry Feuer et al.

It is hereby certified that error appears in the printed specification of the above numbered patent requiring correction and that the said Letters Patent should read as corrected below.

Column 3, line 18, claim 7, line 38, claim 8, and column 4, line 8, claim 9, extreme right-hand portion of the formula, for "2K-", each occurrence, read -- $2K^+$ --.

Signed and sealed this 4th day of November 1958.

(SEAL)
Attest:

KARL H. AXLINE                                                   ROBERT C. WATSON
Attesting Officer                                           Commissioner of Patents